United States Patent Office 2,971,292
Patented Feb. 14, 1961

2,971,292
PRESERVATION OF FLOWERS
George J. Malecki, 519 W. Surf St., Chicago 14, Ill.
No Drawing. Filed Mar. 3, 1958, Ser. No. 718,425
15 Claims. (Cl. 47—58)

This invention relates to a method and means for the preservation of flowers.

This application is a continuation-in-part of the following patent applications: Ser. No. 398,410 of December 15, 1953; and Ser. No. 579,716 of April 23, 1956 (now abandoned).

Flower arrangements made from cut flowers by florists should keep their form and shape during the handling and transportation. In the present practice the stems of cut flowers are imbedded in a pliable plastic foam made of urea-formaldehyde resin, urethane, Styrofoam or like material which has been saturated with water. This foam has an open cell structure. Another practice is to imbed the stems into crumbled chicken wire, stuck into the flower vase, which is filled with water. There is also available a shredded, disintegrated plastic foam which can be adapted easier to the shape of the flower vase, but does not hold so firmly the flower stems. All of the above mentioned methods assure an adequate supply of water to cut flowers, however each method has certain disadvantages.

The plastic foam is expensive; also, water has the tendency to seep out of the open cell foam, particularly on pressing and shaking in transportation. Since florists make most of the flower arrangements in papier mâché containers, free water, which accumulates from plastic foam, sometimes leaks through and runs on carpets or furniture. The same result happens to a still higher degree with crumpled wire and shredded plastic foam, while the shredded plastic foam has, in addition, the disadvantage of not holding firmly the flowers in position.

Also, flowers which are sent loose (not in arrangement) to a customer, or carried away by a customer himself, wilt often due to lack of moisture. To prevent this, flowers are sometimes wrapped in moistureproof paper, but this does not always help.

Furthermore, the soil in flower pots is often unsightly and inconvenient due to its soiling properties. In many places, like living room, dining table, hall, patio, it is often desirable to have the soil in flower pots nice looking and not endangering the cleanliness of the surroundings.

Finally, the water in flower vases in homes is apt to spill if the vase is accidentally overturned. Many accidents are due to water spillage whereby the furniture is ruined and carpets stained.

The present invention obviates the above described disadvantages and gives some important advantages in flower preservation.

It is, therefore, an object of the present invention to provide a novel method and means for flower preservation in storage and transport.

Another object of the present invention is to provide a novel method and means for holding cut flowers in position and supplying them with moisture, while in the arrangement.

A further object of the present invention is to provide a novel method and means for the prevention of water spillage when the flower vase is accidentally overturned.

A yet further object of the present invention is to provide a novel method and means for displaying ornamental features in flower arrangements.

A still further object of the present invention is to provide a novel method and means for constructing a nonsoiling, synthetic soil for flowers with roots.

By use of the term "flower" it is intended to include any plant grown for ornamental purposes, whether in an actual flowering stage or without flowering at all.

Flowers can be preserved much better in transport when their stems are imbedded into a gel, particularly if it contains some plant nutrient. This can be achieved in the simplest way by placing the stems of the flowers (preferably with leaves on) into a plastic or paper bag which is waterproof and afterwards pouring some gel-forming liquid into the bag and allowing it to set. It is not essential, although preferable, whether the gel is applied at nontoxic conditions, since the stems are usually cut off partially on arrival; however, the liquid should not be poured boiling hot with pliable stems so as to cook them.

According to the present invention, an aqueous gel is prepared by dispersing a gel-forming colloid in water and having the gel set. Afterwards, the flowers are imbedded in the gel with their moisture supplying organs (stems, roots). In this way, flower arrangements can be prepared, or flowers with roots grown in the gel, so that prepared flower arrangements can be transported and handled without loss of original shape while the flowers keep their freshness, provided the gel conforms to the below described specifications.

In a preferred embodiment of the invention, a granulated, dry mixture is prepared composed of a water-dispersible, powdered (granulated) colloid and a preferably porous filler. The mixture is stirred into a suitable amount of water so that a gel is formed into which flowers may be imbedded.

Substances which form gels are quite numerous, however only those are suitable, for the purpose of this invention, whose presence does not affect adversely the freshness and general appearance of a given flower under conditions of use. Most gel-forming agents are polymers, which do not penetrate the plant cell wall due to their large molecular weight. For this reason, most gel-forming agents are nontoxic to plants; however some of them release on contact with water toxic ions or substances. For instance, silica and alginic acid release, due to their low pH (3.0–4.0), a high, toxic concentration of hydrogen ions. At pH —4.5 most plants are harmed, except when calcium ions are present. Calcium ions exert a detoxifying effect and allow lowering of pH to about 3.5 or 3.0. Similarly some urea formaldehyde resins release formaldehyde on contact with water and this aldehyde is highly toxic to plant cells. Similarly, some bentonites containing high impurities of soluble fluorides may be unsuitable.

The suitable gel-forming agents may be as follows: bentonite, attapulgite, montmorillonite, china clay (kaolin), fuller's earth, wollastonite, alkali silicates, aluminum hydroxide, inorganic colloid swelling in water, (hydrophilic), Irish moss, carragheen, alginates, algin esters, pectin, pectinates, pectates, tragacanth, gums of arabic, karaya, karya, Senegal, guar, ghatti locust bean, Iceland moss quince seed flax extract, psyllium extract, agar-agar, gluten, zein, soya protein, casein, caseinates, albumin, albuminates, hydrophilic gums, gelatin, dextrin, starch, oxidised starch, instant jelling starch, polygalacturonic acid, carboxymethylcellulose, hydroxyethylcellulose, water-dispersible acetylcellulose and ethylcellulose, methylcellulose, carboxyethylcellulose, polyvinyl-alcohol, polyacrylic polymers and their copolymers, water-dispersible polyvinylchloride, rubber latex powder and other organic latexes of synthetic rubbers and like materials in granulated form (dry), hydrophilic colloids, water-dispersible colloids in dry, granulated form.

The term "gel" referred to above for the purpose of this invention described a pliable or elastic solid, which is soft enough to enable sticking of a flower stem (e.g. mature rose stem) into it, while being hard enough not to flow under lower stress than the weight of its own in a 5" (preferably 10") layer, said stress being applied for not more than 24 hours. The term "plastic solid" describes (in accordance with Maxwell's definition) a solid body exhibiting under any given conditions a definite shape and size, neither of which is greatly altered by the application of a deformatory force until a certain minimum stress is applied. A liquid (according to Maxwell) exhibits a definite size, but no fixed shape, being irreversibly deformed (i.e. exhibiting flow) under all applied stresses.

Another way to define suitable gel properties for the purpose of this invention is by measuring the gel strength under properly standardized conditions. There are numerous varying methods of measuring gel strength and I have chosen particularly one described by Leonard S. Stoloff in Fishery Leaflets No. 306 issued by the U.S. Dept of Interior, Fish and Wildlife Service in April 1948. With this method, the graded diameter of the plunger and the graded rate of application of force should be given for accurate measurement as well as the proper rest time (e.g. 48 to 96 hours) in order to ascertain the gel material that will eliminate any thixotropic effects. I recommend (after Stoloff) using a plunger 1.1 centimeter in diameter and applying force at the rate of 50 grams per second until a gel rupture is obtained. The observed breaking loads are calculated in terms of grams per centimeter plunger circumference and reported to the nearest 10 gram unit for the average of six gels. For the purpose of this invention, so determined gel strength should be not less than 25 grams and not more than 10,000 (preferably 7,000) grams. If the gel is softer than 25 grams, then the weight of a 5" column will crush it gradually, and it will start to flow; while, when it is harder than 10,000 grams, then a flower stem will break before it pierces such a hard gel. Because of the complex nature of most gels, the gel strength measurements are not always a reliable indication; therefore these measurements are less recommended than the simple yardstick of determining the lack of flow in a 5" (preferably 10") layer and the suitability in order to stick the flower stem into it. The above figures of gel strength measurement are given for general orientation purposes as supporting material. It should be kept in mind that the modern rheology teaches that there is no single, simple method of determining gel properties (and as reference to this statement could be given the list of numerous methods of testing plastic bodies tabulated by G. W. Scott-Blair in his book Survey of General and Applied Rheology, Second Edition, 1949, London, I. Pitman, pp. 108 to 114).

Regarding the fillers referred to above, the following are suitable: sand, crushed rock, kaolin, granulated plaster of Paris, granulated foamed concrete, granulated porous ceramic, silica gel, diatomaceous earth, expanded vermiculite, expanded perlite, pumice, expanded zeolite, tree bark granulated (cork also), ground wood, wood flour, shredded excelsior, cellulose powder, disintegrated paper felt, paper wadding, shredded corn cob, paper mulch, absorbent paper scrap, activated carbon, porous bauxite, granulated asbestos, granulated plastic foam (like expanded Styrofoam, urethane, urea-formaldehyde), bran, shredded cotton, granulated mineral wool, granulated or shredded steel wool, shredded glass wool, in general any granular material preferably with a bulk weight less than 40 pounds per cubic foot, most preferably less than 20 pounds per cubic foot.

The preferred gel-forming materials from those listed above are alginate (Example 1) and bentonite (Example 2), while the preferred fillers are wood flour, granulated corn cob, and granulated Styrofoam in various mixtures. The gel formation is greatly facilitated by the presence of an inert, porous, filler. A given colloidal dispersion without a filler is a liquid; while, when mixed in suitable proportions with the filler, the same colloidal dispersion forms a nonflowing gel. This happens particularly when the filler is porous and absorbs or adsorbs water. The following example can illustrate this. A 2% dispersion of carboxymethylcellulose is a very thick, viscous liquid; however, when the same is mixed in suitable proportions (e.g., 100 parts of dispersion to 30 parts of filler) with wood flour, then a nonflowing gel results, which is pliable.

For the above described reasons, the porous fillers are much more suitable for purposes of the invention than nonporous fillers (like sand), although closed cell porous materials (like pumice, foamglass) are also suitable, but the open cell porous materials (like silica gel or granuated ceramic) are preferable for the reasons stated below. Also pliable, porous materials (like ground corn cobs, wood flour, granulated plastic foam) are still more preferable than the rigid open cell materials (like silica gel). These pliable, porous materials may be of open cell type (like shredded paper felt) or else of closed cell type with water permeable cell walls (like corn cob, bran, dehydrated potatoes and vegetables, such as food discarded by U.S.D.A.). The main required characteristic of these pliable, porous materials is that water should squeeze out of them on pressing. The reasons for the above mentioned preferences are elucidated below.

The flowers do not draw water from aqueous dispersions or solutions which have a higher osmotic pressure than that of the plant cell sap. Usually the osmotic pressure of the gel should be in the order of 2-6 atmospheres, however greater variations from 0.2 to 50 atmospheres may be possible, depending on the variety and habitat of a given plant. The following quotations may be helpful, from the book, Plant Physiology, by B. S. Meyer and D. A. Anderson, 2nd edition, 2nd printing 1954, D. Van Nostrand, New York, page 109, lines 26-34: "In general, the osmotic pressures of the plant cells and tissues of the mesic species of North America vary in their extreme range from a fraction of an atmosphere to about 50 atmospheres. Most of the values lie, of course, within a narrower part of this range, probably within the limits of a 4 to 30 atmosphere span of values," and on page 246, lines 32 to 36: "Most plants can develop normally only when the osmotic pressure of the substrate solution does not exceed a few atmospheres." Colloidal dispersions like gels have a much lower osmotic pressure than electrolytes of the same weight percentage. This is due to their much larger molecular weight. For instance, 1% by weight of solution of gum arabic has an osmotic pressure of about 0.1 atmosphere, while only 0.5% by weight of potassium nitrate has an osmotic pressure of over 1.56 atmospheres (Handbook of Chemistry and Physics, 33rd edition, page 1845).

For this reason if no or little electrolytes are present in the gel, then the osmotic pressure is much below isotonic for plant cell sap. Nevertheless the flowers do not draw so easily water from the gel as compared to ordinary fresh water. This is primarily due to the fact that the contact of the gel with flower stem is poor for physical reasons, since two solid bodies never achieve such an intimate contact bevtween themselves as is possible between a solid and a liquid. If water is first poured in a thin layer (e.g. ½-¼") on the top of the gel and flowers are stuck into the gel, then a connecting layer of water is formed between the flower stem and the gel. By this means the withdrawal of water by flowers from the gel is greatly facilitated and the life of the flowers extended. This procedure is not always practical in florists' trade and for this reason it is recommended to introduce into the gel a porous water absorbing, granular material (like ground wood, corn cobs, shredded plastic foam, etc.) (also silica gel, granular ceramic). These porous granules will retain water in a free state within their pores, while being imbedded inside of the gel. This free water will be made available to flowers either by direct contact with the flower stem or by diffusion through the gel layer. It is preferable if some gas (air) is also retained within the pores, because then the withdrawal of water is greatly facilitated. Otherwise the cohesion of water may make the withdrawal of water difficult.

Furthermore, as mentioned above, it is preferable to have this porous material pliable, so that on squeezing it will release free water. In this way when the flower stem is stuck into the gel, free water is squeezed out of the porous material and bathes the flower stem forming a connecting layer between the gel and the flower stem.

An additional effect of incorporating porous materials is that they greatly facilitate dispersion of the gel forming agent. These agents generally have a tendency to form clumps when mixed with water, and in most cases this mixing requires a very vigorous mixing (e.g. sheer mixed) in order to obtain an uniform suspension. The porous material, adsorbs particles of gel-forming material (which should be preferably ground as fine as possible), on its highly developed surface. This way when water is added a much more uniform dispersion is obtained with less mixing action. This is particularly important in florists' trade where no elaborate mixing equipment is, as a rule, available, and the mixing is done by simple kneading with the hands. The efficacy of using porous material as an aid in colloid dispersion is most strikingly demonstrated with attapulgite or swelling type of bentonite (Wyoming type). Namely it is very difficult to obtain an uniform aqueous dispersion of these minerals by simple kneading with the hands. When 20 grams of bentonite is mixed with 100 cc. of water, then a clumpy non-uniform dispersion results, kneading of which does not help much, unless considerable time and effort is spent. However, when 20 grams of the same bentonite is mixed first with 16 grams of wood flour and 4 grams of Styrofoam shavings (fine), then on adding 100 cc. of water to this mixture a uniform dispersion as a nonflowing gel is obtained in few minutes by simple kneading with the hands. Quite unexpectedly, when the above described mixture of gel-forming agent and porous material is kneaded with water in the container, the gel, which has accumulated close to the walls of the container, has more of the gel-forming material and less of the porous material as compared with the gel inside of and closer to the center of the container. This may happen due to some surface tension effects; and in this way a nonporous gel layer is formed around the whole mass protecting against any seepage of water. In addition, each porous particle is enclosed in the gel mass and is usually not interconnected with neighboring porous particles, so that, when the whole gel mass contains pliable, porous, water-absorbing particles, little, if any, water is squeezed out on pressing. However, when the whole gel mass is pierced with a flower stem then some water is squeezed out of the pierced porous particles, so that the ends of the flower stems are bathed in water. This effect is quite important because any water seeping out of the gel mass may run through the papier mâché containers used by florists and do damage to furniture and carpets. In addition to the above mentioned advantages, porous materials have also the advantage of increasing the bulk volume of the powder and decreasing the price per unit of volume.

As a further expedient to increase the porosity and volume of the whole powder, it is recommended to generate some gas within the moist mass before it gels, thus forming a sponge after gelling. For instance, some foaming agent and baking powder can be added to the above described powder, whereby a spongy mass will be created on water addition. Sponges obtained this way are usually of open cell type and absorb water within the pores thus increasing the free water available for the flowers to draw on.

All types of baking powder could be used for this purpose; however, it is recommended to use calcium carbonate or magnesium carbonate and some solid organic acid or acidous salt, which form calcium or magnesium salts of low solubility. This way there will be no accumulation of soluble electrolytes in the gel mass with consequent increase in osmotic pressure. Suitable acidous substances are: calcium and magnesium acid salts of tartaric, malic, citric, fumaric, phosphoric, adipic and similar acids as well as these same acids themselves. In addition to carbonates, other gas releasing agents could be used, such as benzoyl peroxide, perborates, percarbonates, ammonium nitrite and urea. These gas-releasing agents release it at room temperature; however, those agents releasing gas at elevated temperature below 100° centigrade could be employed, such as sodium bicarbonate and ammonium bicarbonate.

Suitable foaming agents are very numerous and, in fact, all those nontoxic to plant cells at conditions of use could be employed, such as alkali or earth alkali lauryl sulfates, caseinates, albuminates, protein hydrolyzates, egg white, collagen hydrolyzate, lignine sulfonates nontoxic to plant cells, and anionic, nonionic or kationic surface active foaming agents.

It has been discovered that the porous structure of the sponge is largely lost where the sponge contacts the walls of the flower container. Probably due to some surface tension effects, the layer in the immediate vicinity of the walls has collapsed gas bubbles, so that not much water seepage occurs from the sponge, and the danger of flooding furniture and carpets is avoided.

To produce ornamental effects it is possible to incorporate any suitable pigment in the gel mass to match the color of earth, leaves, flowers or furniture. For instance, green chrome, blue ultramarine, golden ochra, brown magenta, bronze powder, aluminum powder, various colors of phtalocyanine dye, as well as other aniline pigments, could be used.

It is recommended to add small concentrations of plant nutrients, like dextrose, sucrose, lactose, maltose, dextrin, protein hydrolyzates; also ammonium, potassium or sodium or calcium of magnesium sulfates, nitrates, chlorides, phosphates; also urea, vitamins B1, B2, trace elements Fe, Co, Cu, Mo, Mn, Cr. Same concentration as in hydroponic technique may be used.

Also, it is recommended to add minute amounts of chemical preservatives, which extend the life of flowers probably by their enzyme inhibiting action. For instance, benzoic acid, salicylic, boric acids, respective salts of these acids (suggested amounts 0.001%–0.1% by weight of water used in the gel), silver and zinc salts (0.0001%–0.1% by weight of water in the gel), hypochlorites, antibiotics, like Neomycin, Aureomycin, Terramycin, Streptomycin, Subtilin, chlortetracycline (0.0001%–0.01% by weight of water in the gel). Also it is possible to add plant hormones (e.g. auxins) particularly those which retard the flowering of plants.

Of particular advantage is to add respiration inhibitors, because etiolated (cut) parts of plant, like cut flowers, respire very intensively. The following substances could be added for this purposes: (amounts within limits 0.01–0.1% or less up to 0.001%) ascorbic, isoascorbic, desoxyascorbic, oxyfumaric acids and derivatives, as well as alkaline and earth alkali salts, also same salts of nitrous, sulfurous acids, sodium and potassium glucosates, dextrose, pyrogallol, hydroquinon, propyl gallate, gum guaiac, nordihydroguaiaretic acid, butyldihydroxyanisol antioxidant. Respiration inhibitors extend the life of flowers.

All the above described instructions enable anyone skilled in the art to make suitable gels and use them for the purposes described in the objects of the present invention, as set forth at the beginning of the specification. Accordingly, the flower arrangements made with these gels are more economical to make, more stable, and flowers keep well their freshness. Also, when cut flowers are carried loose from the shop to the customer, then the stems of flowers can be stuck into small pieces of thus prepared gel, so that moisture will be supplied to the flowers until the flowers are put in water.

The same gel can be used in flower vases to supply moisture and at the same time to safeguard against spillage of water when the flower vase is accidentally overturned. The incorporation of cellulose fibers makes the prepared formula look liquid when the flower vase is moved in vertical position, but it does not flow when the vase is placed in horizontal position. Cellulose fibers gather in the way of initially flowing water and prevent the bulk of the water from spilling. Only a few drops usually reach the outside of the vase.

The incorporation of bronze or aluminum powders into the gel adds materially to the ornamental features of the flower arrangement, while their presence does not harm the flowers.

Furthermore, the above described gels can be used as synthetic soil with nonsoiling properties for growing flowers with roots in flower pots in places where the soiling properties of soil are objectionable; for instance, in such places as bathrooms, living rooms, dining table, in the halls.

These gels can be conveniently used to preserve the freshness of flowers shipped by mail from the grower to customers. With dormant roses pieces of gel can be placed inside of the mailing container to keep the relative moisture inside high. With chrysanthemums and similar flowers, which are shipped in the flowering stage with roots, these roots could be imbedded in the gel and thus moisture supplied to flowers in transport without any danger of water spillage or soiling of the inside of the package.

The term "granular" referred to above in the specification describes powders or granules with particle size from a fraction of a micron (0.2) to one inch in diameter.

EXAMPLE 1

*Gel preparation by chemical recation with formation of insoluble salt*

The following ingredients are mixed dry together in a suitable spiral band mixer:

Soft pine wood flour, 16 parts by weight
Styrofoam shavings (fine), 4 parts
"Kelmar" of Kelco Co., 2.5 parts
Calcium sulfate dihydrate, U.S.P., 2.5 parts
Sodium (tetra) pyrophosphate ($Na_4P_2O_7$) anhydrous, 0.5 part
Green chrome pigment, 0.5 part This powder is mixed with 100 parts of water and kneaded by hand for 1–2 minutes. The obtained putty is filled into a flower container or vase and left to set for 10–15 minutes, after which ¼ inch of water is poured on the top of the gel. The flower stems are stuck into the gel in making the flower arrangement which may be transported by truck or otherwise stored and delivered to the customer.

Alternatively, if flowers with roots are used, then the flowers are imbedded into the gelling mass before it sets, because the roots cannot be imbedded into a firm gel. The above described gel sets quite firmly. Some alternatives for "Kelmar": "Kelmar" could be substituted in equimolecular amounts by low-methoxypectin (less than 8% methoxyl content on the basis of 100% calcium pectate), while the calcium sulfate could be substituted equivalent amount of calcium gluconate. With equivalent amount of calcium citrate the use of tetrasodium pyrophosphate is superfluous. It is also possible to use carboxymethylcellulose 2.5 parts (per above proportion) and aluminum acetate basic AlOH (OAc) 2–2.5 parts.

EXAMPLE 2

*Gel preparation with inorganic colloids:*
*(with plant nutrients)*

The following ingredients are dry mixed:

Wood flour, 16 parts
Styrofoam shavings, 4 parts
Wyoming bentonite, 20 parts
Green Chrome pigment, 0.5 part
Dextrose, 0.4 part
Ammonium phosphate, 0.1 part
Potassium chloride, 0.1 part
Vitamin B1 (Thiamine) 40 mgms.

This mixture is kneaded with 100 parts of water and thereafter proceeded as described in Example 1.

EXAMPLE 3

*Gel preparation by cooling (with preservative)*

The following ingredients are dry mixed:

Irish moss with locust bean gum and potassium salts (e.g. "SeaKem type 203" of Seaplant Chemical Corporation)
2.5 grams, ground corn cob 3/8 grade (e.g. from Mt. Pulaski Products Co.)
20 grams, silver nitrate—0.002 gram: (After dry mixing water is added 100 cc.)

This mixture is dispersed in cold water and then heated to 96° C., stirred well and cooled at 50° C.–70° C., then filled into flower vase and cooled to room temperature. The remaining procedure as in Example 1. If flowers with roots are to be grown in this gel then flowers should be imbedded into the gelling mass before it sets into gel, but at a temperature below 70° C.

Alternatives for Irish moss: agar-agar, "Polyox" trademark of Union Carbide Chemicals Corp., calcium pectate, pectin.

EXAMPLE 4

*Gel preparation by cross linking reaction:*
*(without filler)*

The following ingredients are dry mixed:

Borax, 8 parts
Calcium carbonate, 6 parts
"Kelgin" of Kelco Co., 6 parts

Afterwards, the mixture is stirred into 200 parts of water, vigorougsly agitated, and left to set for 5–7 minutes. The remaining procedure as in Example 1.

EXAMPLE 5

*Gel sponge formation*

The following ingredients are dry mixed:

Carboxymethylcellulose, 1.5 parts (e.g. "CMC 70 D High" of Hercules Powder Co.)
Wyoming bentonite, 20 parts
Wood flour, 20 parts
Sodium lauryl sulfate, 1.5 parts
Sodium bicarbonate, 1.5 parts
Tartaric acid, 1.5 parts After drying mixing 100 parts of water is added, whereby a spongy mass results on further mixing.

Alternatives for carboxymethylcellulose:

Methylcellulose, hydroxyethylcellulose, "Polyox" of Union Carbide Chemicals Corp., instant gel starch, oxidised cellulose, etc.

Instead of using bicarbonate and acid, the water could have hydrogen peroxide added, and this chemical on decomposition will release gas.

EXAMPLE 6

*Nonflowing water for prevention of water spillage from vase*

The following ingredients are dry mixed:

"Solka-Floc" BW 40 grade of Brown Co., 12 parts
"Solka-Floc" SW 40A grade of Brown Co., one and one eighth parts
Styrofoam shavings (fine), 1 part This mixture should be filled in flower vase to ⅔ of its volume and water added in mixing until the mass will start looking liquid on shaking the vase, but will not pour out of the vase on turning it horizontal. Flowers will keep in this mixture still better if some nutrient solution is used instead of water such as Knop solution or like.

EXAMPLE 7

*Liquid formula to be dispersed in water for gel preparation*

"Polyox" of Union Carbide Chemicals Corp. (highest viscosity grade-coagulant), 2 parts
Glycerine, U.S.P., 5–10 parts This pasty mass should be dispersed for use in 150 parts of water to form a gel. By using a predispersion in glycerine the resulting gel is much more uniform. A clear gel results, which can be used as in Example 1. Similar liquid dispersions for gel preparation can be prepared with other gel forming materials, and glycerin can be replaced by acetone, ethylalcohol, isopropanol and similar organic solvents mixable with water and non-toxic to plants. It is also feasible and possible to prepare a concentrated dispersion in water of gel forming agent to have it diluted later on with more water and eventual addition of setting agents (like borax, calcium salts) for consumer gel preparation.

What is claimed is:

1. In the method of preservation of flowers in fresh state the step comprising keeping said flower's moisture supplying organs in an aqueous gel made from a colloid selected from the group of colloids consisting of bentonite, attapulgite, china clay, kaolin, fuller's earth, wollstonite, alkali silicates, aluminum hydroxide, inorganic colloid swelling in water, Irish moss, carragheen, alginates, algin esters, algin derivatives, pectin, pectinates, pectates, tragacanth, gums of arabic, Karraya, kara, Senegal, guar, ghatti, locust bean, Iceland moss, quince seed, flax extract, psyllium extract, agar-agar, gluten, zein, soya protein, casein, caseinates, albumin, albuminates, hydrophilic gums, gelatin, dextrin, starch, oxidized starch, instant gel starch, polygalacturonic acid, carboxymethylcellulose, hydroxyethylcellulose, water-dispersible acetylcellulose and ethycellulose, methylcellulose, polyethyleneoxide, carboxyethylcellulose, polyvinylalcohol, polyacrylic polymers and their copolymers, water-dispersible polyvinylchloride, rubber latex, synthetic rubber latex, hydrophilic colloid, water swelling colloid, water-dispersible colloid.

2. In the method of preservation of fresh flowers the step comprising keeping said flower's moisture supplying organs in an aqueous gel formed by mixing a dry, granulated colloid selected from the group of colloids consisting of bentonite, attapulgite, china clay, kaolin, fuller's earth, wollstonite, alkali silicates, aluminum hydroxide, aluminum salts (precipitating aluminum hydroxide with alkalies), inorganic colloid swelling in water, Irish moss, alginates, algin esters, algin derivatives, carragheen, pectin, pectinates, pectates, tragacanth, gums of arabic, Senegal, karaya, karya, guar, ghatti, locust bean, Iceland moss, quince seed, flax extract, psyllium extract, agar-agar, gluten, zein, soya protein, casein, casein- ates, albumin, albuminates, hydrophilic gum, gelatin, dextrin, starch, oxidized cellulose, instant gelling starch, polygalacturonic acid, carboxymethylcellulose, hydroxyethylcellulose, water-dispersible acetylcellulose and ethylcellulose, methylcellulose, polyethylenoxide, carboxyethylcellulose, polyvinyl alcohol, polyacrylic polymer and its copolymer, water-dispersible polyvinylchloride in dry granulated form powdered rubber latex precursor, powdered synthetic rubber latex precursor, dry granulated hydrophilic colloid, dry, granulated hydrophilic colloid, dry, granulated water-dispersible colloid, with a dry, granulated filler selected from the group consisting of sand, crushed rock, kaolin, granulated plaster of Paris, granulated foamed concrete, granulated porous ceramic, silica gel, diatomaceous earth, expanded vermiculite, expanded perlite, pumice, expanded zeolithe, granulated tree bark, granulated cork, ground wood, wood flour, shredded excelsior, cellulose powder, disintegrated paper felt, paper wadding, shredded corn cob, paper mulch, absorbent paper scrap, activated carbon, porous bauxite, granulated asbestos, granulated plastic foam, granulated expanded Styrofoam, granulated expanded urethane, granulated expanded urea-formaldehyde resin, bran, shredded cotton, granulated mineral wool, shredded steel wool, shredded glass wool, granulated glass foam, granular, inert material preferably with bulk weight less than 40 pounds per cubic foot and most preferably less than 20 pounds per cubic foot, and water, whereby a gel is formed.

3. The step defined by claim 1 wherein a connecting layer of water in a free state is introduced between the gel and the flower's moisture supplying organs.

4. The step defined in claim 2 wherein the granulated filler is a porous material.

5. The step defined in claim 2 wherein the granular filler is a water-absorbing material.

6. The step according to claim 2 wherein a dry, granular gas releasing agent is added to said dry, granular mixture before addition of water.

7. The step defined in claim 1 wherein a chemically reducing agent is added to said gel, said reducing agent being selected from the group consisting of ascorbic, isoascorbic, desoxyascorbic, oxyfumaric, acids their derivatives as well as alkaline and earth-alkali salts, also same salts of nitrous, sulfurous acids, sodium and potassium glucosates, dextrose, pyrogallol, hydroquinone, propyl gallate, gum guaiac nordihydroguaiaretic acid, butyldihydroxyanisol antioxidant, respiration inhibitor.

8. The step according to claim 1 wherein plant nutrients and vitamins are added to said gel.

9. The step defined in claim 1 wherein plant hormones are added to said gel.

10. The step defined in claim 2 wherein an aluminum powder pigment is added to said dry granulated mixture.

11. The step defined in claim 2 wherein a bronze powdered pigment is added to said dry granulated mixture.

12. The step according to claim 1 wherein a gas releasing agent is added to said gel.

13. A mixture of granular ingredients available commercially for the preservation of fresh flowers comprising a hydrophilic colloidal material capable of swelling in aqueous medium, and an agent releasing gas by chemical action.

14. A mixture of granular ingredients available commercially for the preservation of fresh flowers comprising a hydrophilic colloidal material capable of swelling in aqueous medium, an agent releasing gas by chemical action, and a foaming agent.

15. In the method of preservation of fresh flowers the step comprising keeping said flowers' stems in contact with an aqueous gel of a polymer selected from the group consisting of agar, Irish moss, pectin, pectinates, alginates, methylcellulose, carboxymethylcellulose, ethylcellulose, gums of arabic, Senegal, guar, karya, karaya, tragacanth, locust bean, Iceland moss, polyvinylalcohol, polyacrylic resins, urea-formaldehyde resins, hydrophile gums, whereby said flowers draw moisture from said gel during transport and storage and preserve their freshness.

References Cited in the file of this patent

UNITED STATES PATENTS

| | | |
|---|---|---|
| 1,076,786 | Reinherz | Oct. 28, 1913 |
| 1,978,201 | Heuer | Oct. 23, 1934 |
| 2,203,274 | Anderson | June 4, 1940 |
| 2,567,929 | Fessenden | Sept. 18, 1951 |
| 2,570,537 | Finch | Oct. 9, 1951 |
| 2,614,039 | Hammer | Oct. 14, 1952 |

FOREIGN PATENTS

| | | |
|---|---|---|
| 514,250 | Great Britain | Nov. 3, 1939 |

OTHER REFERENCES

Richmond (Va.) News Leader, Saturday, March 25, 1944, page 4, article, "Preserving Flowers."

Hackh's Chemical Dictionary, Third Edition, published by Blakiston (Philadelphia), 1944, page 552 is relied on.

New York Times (newspaper), Sunday, Feb. 22, 1948, Section 4, page E-9, article, "Preserving Flowers."

B. F. Goodrich Co., Trademark 599,247, December 14, 1954.